April 5, 1932.  P. H. NORDMEYER  1,852,473
ANIMAL TRAP
Filed May 8, 1930  2 Sheets-Sheet 1
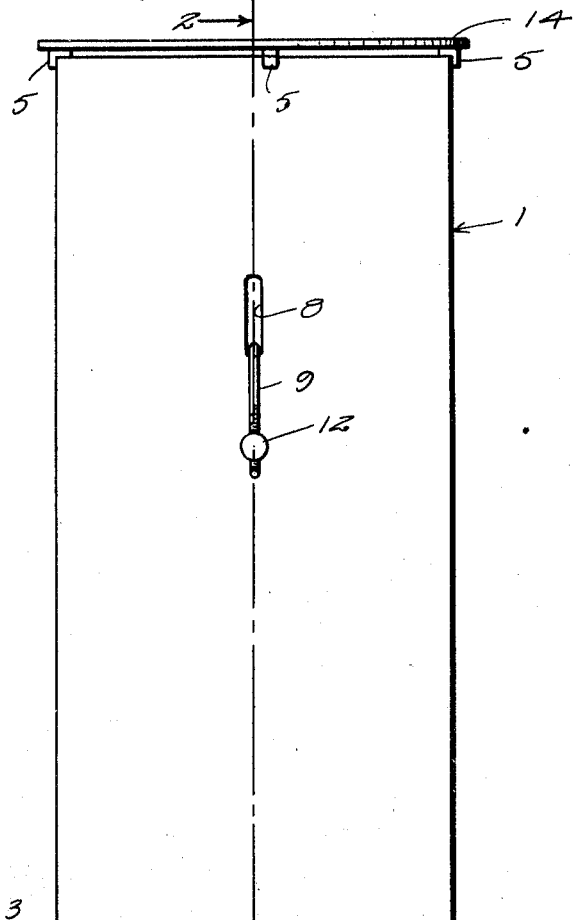
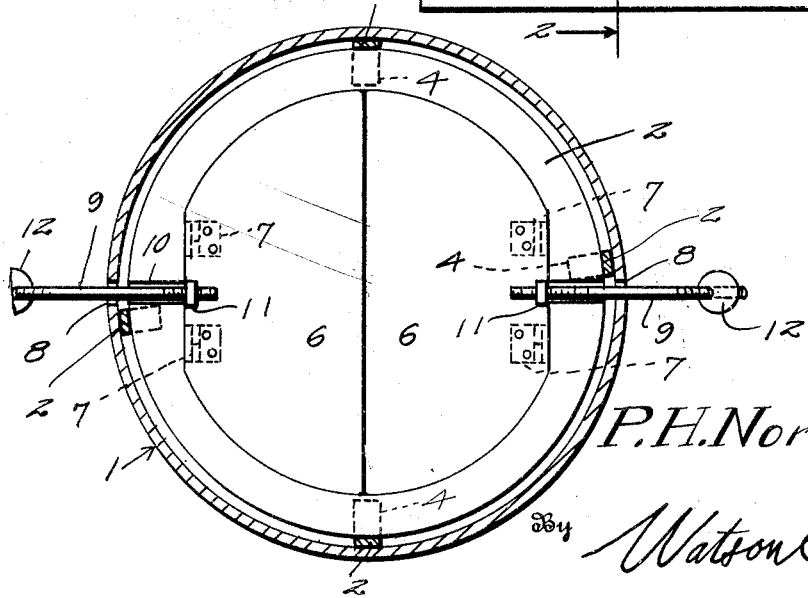
Inventor
P. H. Nordmeyer
By Watson E. Coleman
Attorney April 5, 1932.  P. H. NORDMEYER  1,852,473
ANIMAL TRAP
Filed May 8, 1930   2 Sheets-Sheet 2
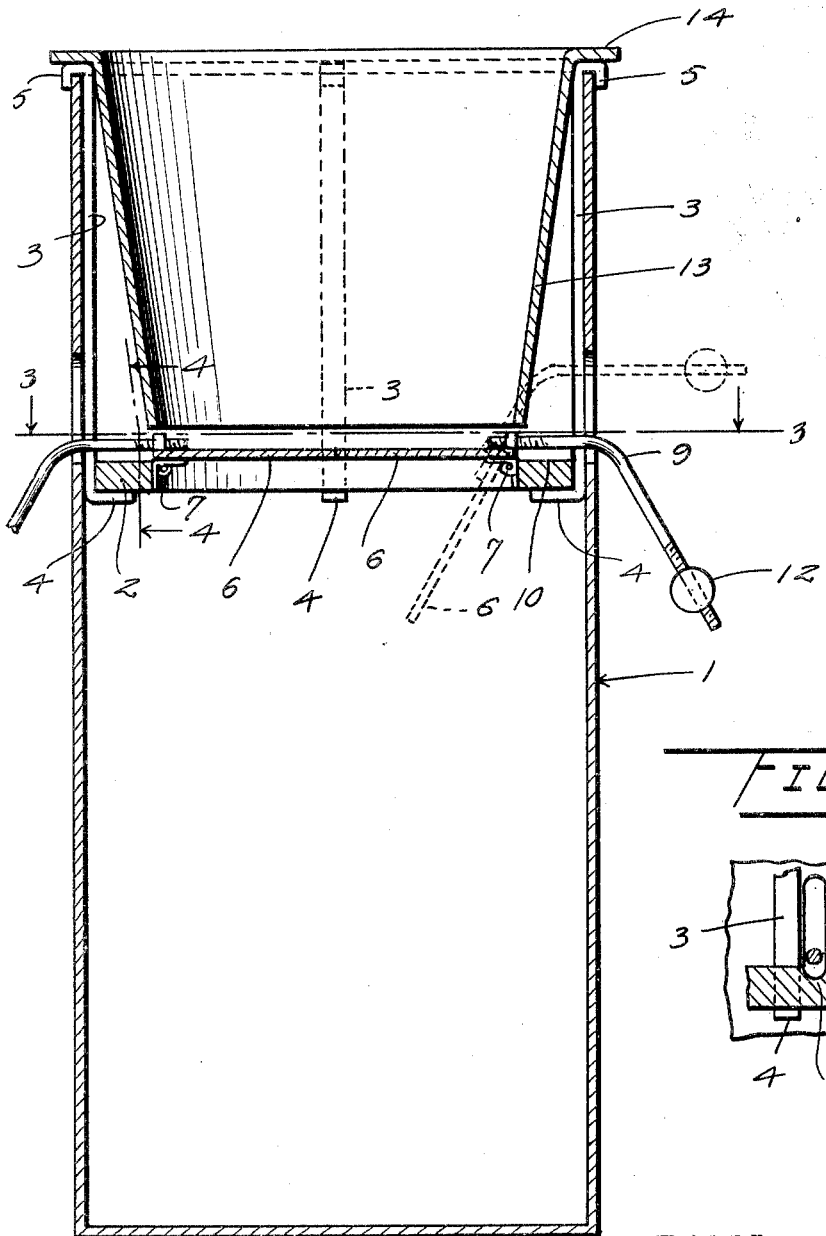
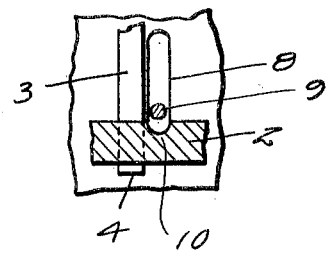
Inventor
P. H. Nordmeyer
By Watson E. Coleman
Attorney Patented Apr. 5, 1932

1,852,473

UNITED STATES PATENT OFFICE

PHILIP H. NORDMEYER, OF GLASGOW, MISSOURI

ANIMAL TRAP

Application filed May 8, 1930. Serial No. 450,803.

This invention relates to improvements in animal traps and pertains particularly to an improved trap for rats and mice.

The primary object of the present invention is to provide a trap which will automatically reset itself each time an animal has been caught so that the limit to the number of animals which may be captured thereby will only be limited by the size or capacity of the trap.

The invention broadly contemplates the provision of a receptacle preferably of circular contour, in which there is fixed at a point below the open top thereof a ring body in which is a pair of doors each of which is pivotally attached to the ring. Weight controlling arms govern these doors to normally maintain the same in horizontal or closed position. The area between the door carrying ring and the top of the trap is covered by a removable body which is suspended from the open upper end of the trap body and which has its lower end constricted slightly so that its diameter is no greater than the interior diameter of the door carrying ring. Thus, when animals leap down onto the pivotally mounted doors to obtain bait which may be secured thereto, the doors will yield and allow them to be deposited in the bottom of the receptacle and the funnel shaped liner in the top of the receptacle will prevent the animal obtaining a hold upon the ring to which the doors are pivotally attached. The door carrying ring is so mounted in the receptacle that it may be removed if necessary or its position may be altered with respect to the top of the receptacle.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claim.

In the drawings:

Figure 1 is a view in side elevation of the trap constructed in accordance with my invention.

Figure 2 is a vertical sectional view taken on the line 2—2 of Figure 1.

Figure 3 is a transverse sectional view taken on the line 3—3 of Figure 2.

Figure 4 is a detailed sectional view taken on the line 4—4 of Figure 2.

Referring more particularly to the drawings wherein like numerals of reference indicate corresponding parts throughout the several views, the numeral 1 designates the body of the trap which, as shown, is of cylindrical design. While, of course, it is not essential that the trap be cylindrical this design is preferred.

Suspended within the body of the trap from the open top thereof, is a ring 2 which may be of wood or metal. This ring is maintained in the proper position by means of hangers 3 each of which at its lower end passes through or over the side edge of the ring and is turned under as at 4 to engage the ring while the upper end is formed to provide a hook 5, which, as shown, engages over the top edge of the receptacle.

The ring 2 is closed by a pair of trap doors each of which is indicated by the numeral 6. Each of these doors is secured to the ring by a pair of hinges 7, the hinges of one door being diametrically opposite those of the other door as shown so that the doors will swing in the same vertical plane.

The receptacle or body 1 of the trap is provided at diametrically opposite points with the longitudinally extending slots 8 which extend transversely of the door carrying ring 2 when the same is in the proper position, between the hinges 7 of the adjacent door. Each of these slots has extended therethrough one end of a balance rod 9 which end passes into the receptacle over the ring 2 and over a transverse groove 10 therein for threaded engagement in a nut 11 carried by the door. At its outer end each rod 9 is bent to extend downwardly and is threaded to receive a weight 12.

Depending into the top of the trap receptacle is a shield 13 which, as shown, is of gradually decreasing diameter from its upper to its lower end, the lower end being of substantially the same diameter as the interior of the door carrying ring 2. The upper end of this shield has a laterally directed surrounding flange 14 which overlies the top edge of the receptacle and thus supports the shield in position. The shield is of such a length that the lower edge thereof is spaced about one-half an inch from the ring 2. As will be readily understood this shield 13 which acts in the nature of a funnel to direct animals downwardly toward the center of the doors, prevents the animals from obtaining a hold upon the ring 2.

In operation, if the trap is to be used for catching rats, the door carrying ring 2 will be suspended at a point substantially ten inches from the top of the receptacle, assuming that the rats to be captured approximate eight inches in length. After the doors have been properly placed and the shield 13 has been put into position bait may be fixed in any suitable manner to the doors 6 or inside the trap, so that the animal in attempting to get the bait will jump down onto the doors. These will, of course, give under the animal's weight and cause it to be deposited in the receptacle. The weighted arms or rods 9 will swing the doors back to the proper horizontal position after the animal has passed through the ring so that there will be nothing in the appearance of the trap to frighten the next animal that comes to the mouth thereof.

In assembling the trap the door carrying ring minus the weight rods 9 is lowered into the receptacle by the hanger rods 3 after which the arms are inserted through the slots 8 and attached to their respective doors through the medium of the threaded nut 11. Adjustment of the weights 12 is then made so that the doors will be held in horizontal position after which the shield 13 is put into place and the trap is then ready for use.

When in use the receptacle 1 may be partially filled with water. By doing this the rats or mice after being precipitated thereinto will be drowned and may then be easily disposed of when the trap is emptied.

Having thus described my invention, what I claim is:

An animal trap, comprising a receptacle having an open top, a ring member designed to be arranged horizontally within the receptacle at a point below the top, a plurality of hanger members each having a hooked upper end for engagement over the top edge of the receptacle and each having connection with said ring for supporting it in position in the receptacle, a shield member of circular cross-section having a flange top edge designed to engage over the top edge of the receptacle to maintain the body portion thereof extending downwardly in the receptacle, a pair of doors hingedly mounted in said ring, a threaded lug carried by each door, an arm member having threaded connection with each lug and extending laterally over said ring through an aperture in the adjacent wall of the receptacle to the outside thereof, and a weight member adjustably mounted upon the outer end of each arm.

In testimony whereof I hereunto affix my signature.

PHILIP H. NORDMEYER.